US007177747B2

(12) United States Patent
Hiwatashi

(10) Patent No.: US 7,177,747 B2
(45) Date of Patent: Feb. 13, 2007

(54) VEHICLE BRAKING DEVICE AND VEHICLE BRAKING METHOD

(75) Inventor: Yutaka Hiwatashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 398 days.

(21) Appl. No.: 10/880,608

(22) Filed: Jul. 1, 2004

(65) Prior Publication Data

US 2005/0004739 A1 Jan. 6, 2005

(30) Foreign Application Priority Data

Jul. 4, 2003 (JP) ............................ 2003-192074

(51) Int. Cl.
*G06F 19/00* (2006.01)

(52) U.S. Cl. ........................................................ 701/70

(58) Field of Classification Search .................. 701/70
See application file for complete search history.

(56) References Cited

U.S. PATENT DOCUMENTS 4,591,858 A * 5/1986 Jacobson .................... 342/169
2002/0198632 A1* 12/2002 Breed et al. ................... 701/1

FOREIGN PATENT DOCUMENTS

| | | |
|---|---|---|
| JP | 5-114099 | 5/1993 |
| JP | 5-265547 | 10/1993 |
| JP | 8-45000 | 2/1996 |
| JP | 10-338111 | 12/1998 |

* cited by examiner

*Primary Examiner*—Thu V. Nguyen
(74) *Attorney, Agent, or Firm*—McGinn IP Law Group, PLLC

(57) ABSTRACT

Vehicle braking is precisely performed matching with a condition. A recognizing unit 5 recognizes a target object based on information from a preview sensor 2 for detecting a forward condition of a vehicle, and outputs positional information of the target object thus recognized as preview information. An information acquiring unit 6 specifies a target object located on a road based on information from an infrastructure 30 equipped on a road, and outputs position information of the target object thus specified as infrastructure information. If an instructing unit 7 authorizes the automatic braking of the vehicle carried out by the controlling unit 8 under the condition that the matching between a position of the target object based on the preview information and a position of the target object based on the infrastructure information is established, the controlling unit 8 carries out the automatic braking of the vehicle.

12 Claims, 4 Drawing Sheets

VEHICLE BRAKING DEVICE AND VEHICLE BRAKING METHOD

BACKGROUND OF THE INVENTION

1. Field of the Invention

The present invention relates to a vehicle braking device and a vehicle braking method, and particularly to brake control using information from a vehicle-installed preview sensor in combination with information from a road-side infrastructure.

2. Description of the Related Art

There has been hitherto known a vehicle braking device for automatically braking a vehicle with no driver's braking operation as disclosed in the Japanese Published Patent Application No. 10-338111, for example. Such a type of vehicle braking device automatically judges the degree of risk at which the vehicle collides with a target object (a preceding vehicle, a pedestrian or the like) existing in front of the vehicle, and carries out a vehicle braking operation to avoid the collision when the degree of risk is high. In order to accurately carry out the vehicle braking operation matched with a forward condition of the vehicle, the vehicle requires precise detection of the target object located in front of the vehicle concerned. Therefore, it has been hitherto carried out to install a preview sensor (for example, a sensor using millimetric-wave or laser wave, or a stereo image processing device comprising a stereo camera and an image processing system) in a vehicle and scanning or imaging a scene in front of the vehicle by using the preview sensor to thereby detect/recognize the target object.

In the brake control based on only the information from the preview sensor, however, if a target object is misidentified by the preview sensor, brake control not matched with a condition may be carried out.

SUMMARY OF THE INVENTION

The present invention has been implemented in view of the foregoing situation, and has an object of accurately performing a vehicle braking operation matched with a condition.

In order to solve such problems, a first invention provides a vehicle braking device, including a recognizing unit for recognizing a target object based on information from a preview sensor that detects a forward condition of a vehicle and outputting position information of the target object thus recognized as preview information, an information acquiring unit for specifying a target object located on a road based on information from an infrastructure equipped on the road and outputting position information of the target object thus specified as infrastructure information, a controlling unit for automatically braking the vehicle, and an instructing unit for authorizing the controlling unit to automatically brake the vehicle under the condition that matching between a position of the target object based on the preview information and a position of the target object based on the infrastructure information is established.

In the first invention, it is preferred that the information acquiring unit acquires pedestrian information concerning positions of pedestrians at an intersection, the pedestrian information being detected by the infrastructure.

Additionally, in the first invention, it is preferred that the instructing unit does not authorize the controlling unit to automatically brake the vehicle under the condition that the matching between the position of the target object based on the preview information and the position of the target object based on the infrastructure information is not established. Further, it is preferred in the first invention that the controlling unit carries out information provision based on the information from the infrastructure or gives an alarm to evoke attention to the target object in accordance with reliability of detection precision of the target object by the preview sensor.

A second invention provides a vehicle braking method, including a first step of recognizing a target object based on information from a preview sensor that detects a forward condition of a vehicle, and outputting position information of the target object thus recognized as preview information, a second step of specifying a target object located on a road based on information from an infrastructure equipped on the road, and outputting position information of the target object thus specified as infrastructure information, a third step of automatically braking the vehicle, and a fourth step of authorizing the automatic braking of the vehicle under the condition that matching between a position of the target object based on the preview information and a position of the target object based on the infrastructure information is established.

In the second invention, it is preferred that the fourth step does not authorize the automatic braking of the vehicle under the condition that the matching between the position of the target object based on the preview information and the position of the target object based on the infrastructure information is not established. Additionally, it is preferred that the second invention further includes a fifth step of carrying out information provision based on the information from the infrastructure or giving an alarm to evoke attention to the target object in accordance with reliability of detection precision of the target object by the preview sensor.

DESCRIPTION OF PREFERRED EMBODIMENT

Figure 1:
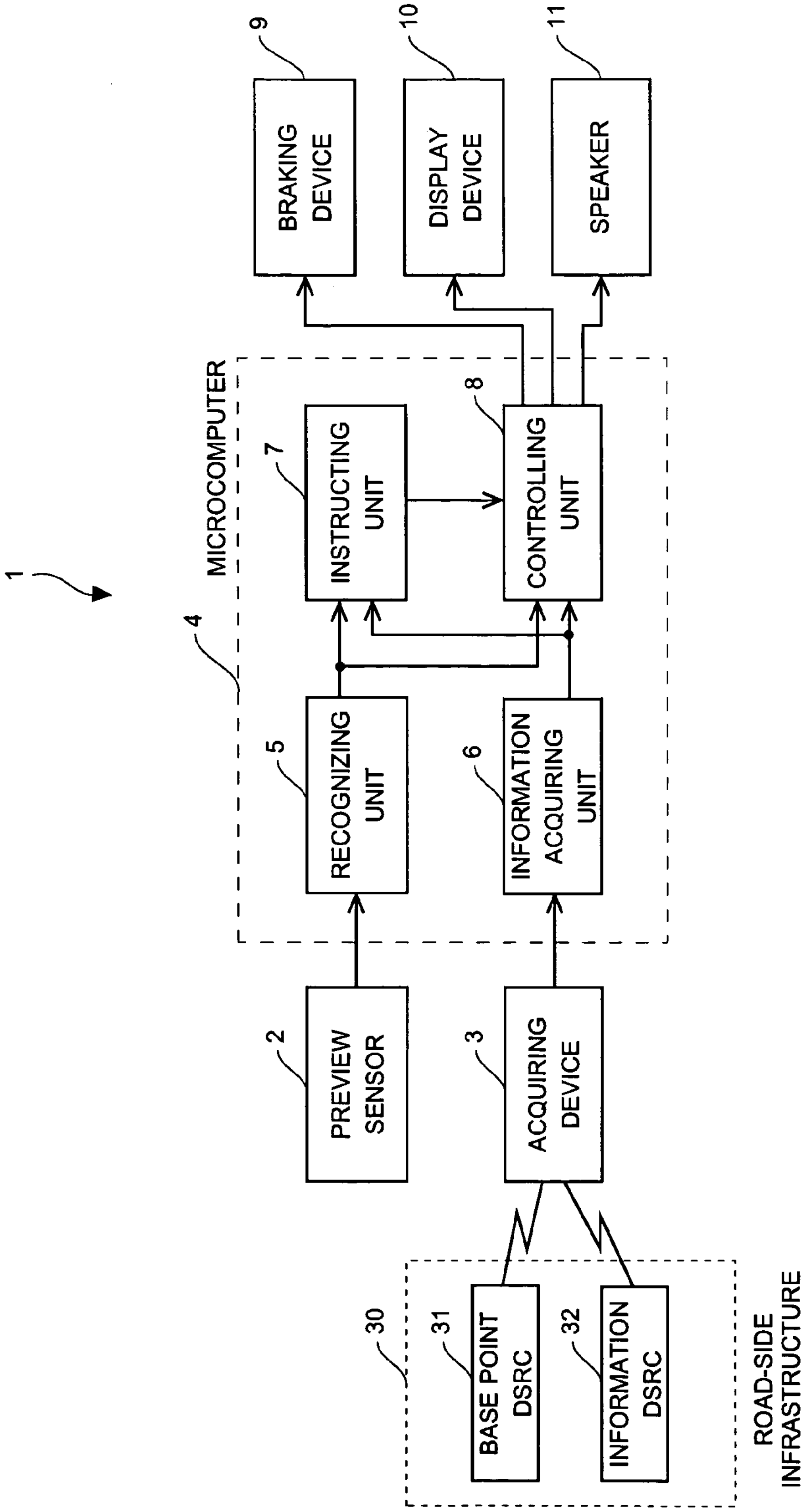
FIG. 1 is a block diagram showing the overall construction of a vehicle braking device according to the present embodiment.

FIG. 1 is a block diagram showing the overall construction of a vehicle braking device 1 according to the present embodiment. A preview sensor 2 is a sensor used for detecting a forward condition of a vehicle, and installed in the vehicle concerned. In the present embodiment, a well-known stereo image processing device comprising a stereo camera and an image processing system is used as the preview sensor 2. In addition to the stereo image processing device described above, a single-eye camera, a sensor using millimetric-wave or laser wave, a sensor using both of them, etc. can be broadly used. If the stereo image processing device is used, a pair of image data acquired from the stereo camera that images the front side of the vehicle concerned (a travel direction) are subjected to stereo matching processing as input information to calculate distance data. In the distance data, a position on a two-dimensional image plane defined by the image data is associated with the distance (accurately, a parallax) to a target object pictured at the position, and the distance data shows a two-dimensional distribution of the distance in front of the vehicle. The details of the distance data calculation are disclosed in JP-A-5-114099, which may be referred to if necessary.

An acquiring device 3 acquires information from a road-side infrastructure 30. Since transmission of information from the road-side infrastructure 30 is carried out in a wireless communication style, the acquiring device 3 is composed of a well known antenna and radio equipment.

Figure 2:
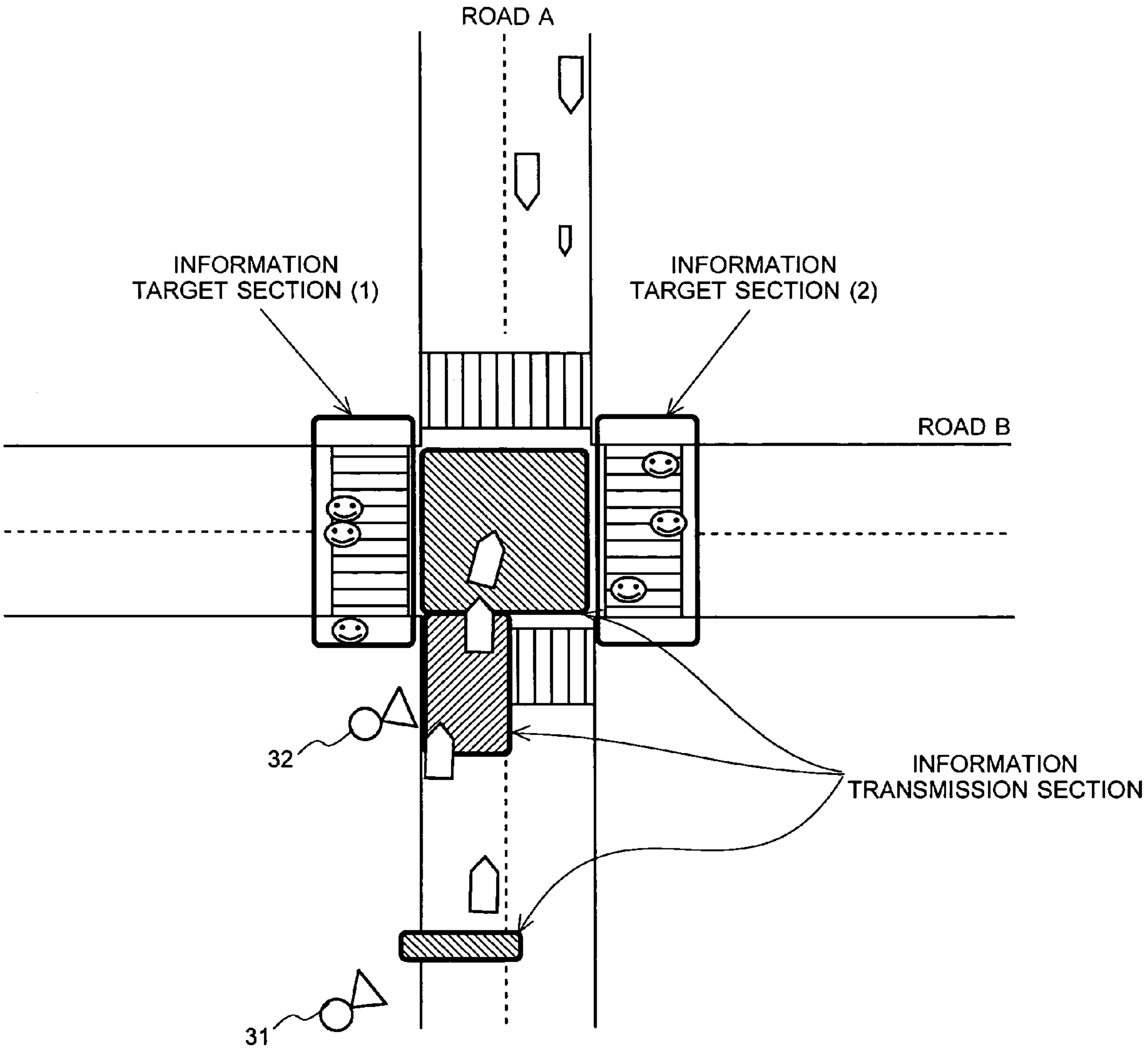
FIG. 2 is a diagram showing a road-side infrastructure.

FIG. 2 is a diagram showing the road-side infrastructure 30. In general, the road-side infrastructure 30 carries out communications with road-vehicles in a traffic system called as AHS to supply information concerning a traffic condition to the vehicle side. The road-side infrastructure 30 comprises DSRCs (Dedicated Short Range Communication) arranged sequentially or discretely. Considering DSRC functionally, it comprises a base point DSRC 31 and an information DSRC 32. The base point DSRC 31 is a DSRC which indicates start of a service and also serves as a positional standard in a service area (an area set on a road where the service is supplied), and transmits base-point information. On the other hand, the information DSRC 32 transmits service information. The service information contains a service type, an actuation/non-actuation state of the service, an end point of the service area, individual service information, etc. Various kinds of the individual service information exist in connection with respective service areas, and information concerning pedestrians on a pedestrian crossing at an intersection (hereinafter referred to merely as "pedestrian information") corresponds to the individual service information in the present embodiment.

The pedestrian information is unitarily managed by a base station not shown in figures. For supplying information to a vehicle traveling toward the upper side of a road A as shown in the figure, the base station sets information target sections (1) and (2) so as to cover pedestrian crossings existing at the right-hand and left-hand sides of the intersection. With respect to the information target sections (1) and (2), the condition inside each of the information target sections (1) and (2) is imaged or scanned every predetermined time by a visible-light camera, an infrared camera, an infrared sensor or the like. The base station detects the positions of pedestrians (containing light vehicles, etc.) on the pedestrian crossing in each of the information target sections (1) and (2) based on output information from the camera or sensor to create/renew the service information to be supplied to the vehicle side as needed.

The microcomputer 4 comprises a CPU, a ROM, a RAM, an input/output interface, etc. Considering the microcomputer 4 functionally, it comprises are cognizing unit 5, an information acquiring unit 6, an instructing unit 7 and a controlling unit 8. The recognizing unit 5 recognizes target objects in front of the vehicle concerned based on information acquired from the preview sensor 2 (distance data in the present embodiment). Subsequently, a three dimensional position containing the distance D to each of the target objects is calculated, and output to the instructing unit 7 at the subsequent stage as "preview information" (information concerning the target object created based on the information from the preview sensor 2).

On the other hand, information transmitted from the road-side infrastructure 30, that is, the base point information and the service information are input through the acquiring device 3 to the information acquiring unit 6. Based on the information thus input, the information acquiring unit 6 recognizes on-road target objects (accurately, pedestrians on the pedestrian crossing) detected by the road-side infrastructure 30. This recognition result is output to the instructing unit 7 at the subsequent stage as "infrastructure information" (information relevant to the target objects created based on the information from the road-side infrastructure 30).

The instructing unit 7 judges it based on the preview information from the recognizing unit 5 and the infrastructure information from the information acquiring unit 6 whether the automatic braking operation of the vehicle should be carried out or not, and instructs the controlling unit 8 according to the judgment result. If the automatic braking operation is authorized, the controlling unit 8 executes the brake controlling operation considering the distance to the target object based on the preview information from the recognizing unit 5. Braking by a brake, braking by reduction in output of an engine, braking by shift-down of a transmission or the like is known as a braking means of a vehicle. In the present embodiment, a brake is applied to braking, which can carry out the braking most rapidly. During a vehicle braking operation, the controlling unit 8 controls a braking device 9, and applies braking pressure to a wheel cylinder of each wheel. Accordingly, irrespective of driver's braking or non-braking operation, the vehicle is braked at a predetermined deceleration. On the other hand, if the automatic braking operation is not authorized, the controlling unit 8 does not execute the brake control described above. Thus, in this case, the brake control of the vehicle is exclusively charged to the driver's braking operation. Furthermore, the controlling unit 8 controls a display device 10 and a speaker 11 so as to display the service information acquired by the information acquiring unit 6 or carry out alarm process to evoke driver's attention as occasion demands.

Figure 3:
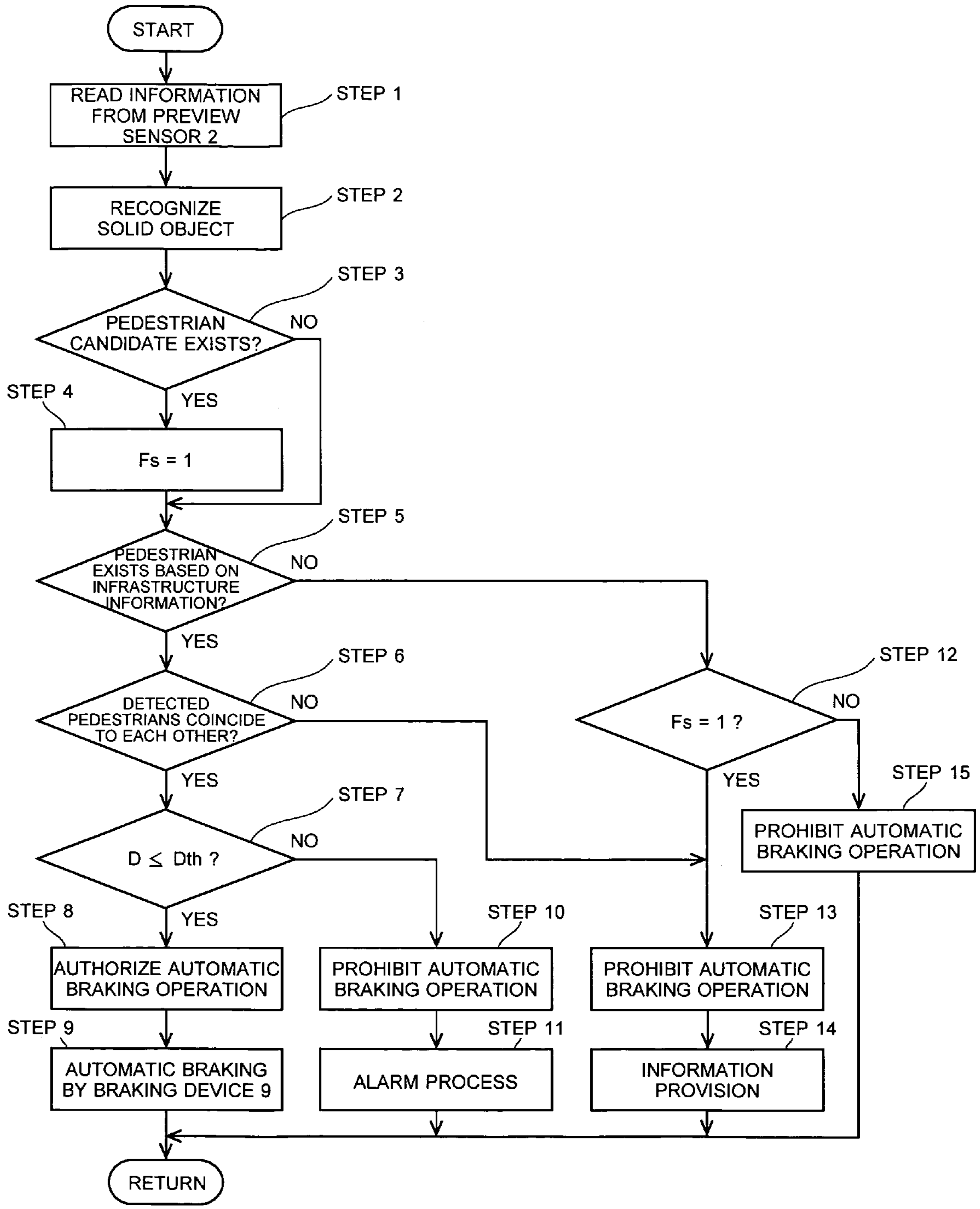
FIG. 3 is a flowchart showing system process according to the present embodiment.

FIG. 3 is a flowchart showing system process according to the present embodiment. The routine indicated by this flowchart is called and executed by the microcomputer 4 at a predetermined interval while the vehicle concerned travels in the service area. First, when the vehicle passes over an information transmission section formed by the base point DSRC 31, base point information is input. By judging based on the base point information that this information is specified as information transmitted from the base point DSRC 31, the microcomputer 4 recognizes entrance of the vehicle to the service area.

Subsequently, when the vehicle passes over an information transmission section formed by the information DSRC 32, service information is input. Based on the service information, the microcomputer 4 specifies an ID of the base point DSRC 31 to be combined with the information DSRC 32 over which the vehicle passes at present. The ID thus specified is compared with an ID of the base point DSRC 31 over which the vehicle passed previously. Only when coincidence of both IDs is recognized, this service information is judged to be supplied to the vehicle concerned, and a first cycle of this routine is executed. First, in step 1, the recognizing unit 5 reads out information from the preview sensor 2.

In step 2, target objects in front of the vehicle concerned are recognized based on the information thus read, and the preview information is created. In the present embodiment, a target object to be recognized corresponds to a solid object such as a vehicle traveling in front of the vehicle concerned, a pedestrian or an obstacle. In the recognition process of the solid object, the distance data is divided into strip-like sections (predetermined width in a horizontal direction) extending in a vertical direction, and a distance (representative distance) representing each section and an existing position of the solid object corresponding to the representative distance concerned are determined. Subsequently, by comparing the representative distances of the respective neighboring sections, the respective sections whose representative distances are proximate to one another are collected in the same group. The arrangement direction of the existing positions related to respective sections contained in a group is checked, and the group is divided at a part where the arrangement direction varies significantly. Group for which the arrangement direction of the existing positions is substantially parallel to the vehicle-width direction are classified into solid objects. Then, three-dimensional positions including the right and left end positions are calculated (creation of the preview information) for the groups classified as the solid object. The recognition of the target objects is carried out by referring to image data, sensor information from a vehicle sensor, a steering sensor, a navigation sensor, etc. not shown in figures if necessary.

The details of the recognition process of the solid object are disclosed in JP-A-5-265547 or JP-A-8-45000, and thus it may be referred to if necessary.

In step 3, the instructing unit 7 judges based on the preview information from the recognizing unit 5 whether any solid object serving as a pedestrian candidate exists in front of the vehicle concerned. Since the pedestrian is smaller in size than a preceding vehicle, a group whose arrangement-direction width is not larger than a predetermined value (for example, 1 meter) may correspond to the pedestrian with high probability. Therefore, the instructing unit 7 specifies as candidates of pedestrians those groups which satisfy the above condition among the groups classified as "solid objects" by the recognition process of the solid objects. If a positive judgment is made, that is, if it is judged in the step 3 that some pedestrian candidate exists, the process shifts to step S4. On the other hand, in the step 3, if a negative judgment is made, that is, no pedestrian candidate exists, the process shifts to step 5 skipping the step 4.

In the step 4, a pedestrian detecting flag Fs is set to "1", and the process shifts to the step 5. The pedestrian detecting flag Fs is initially set to "0", and set to "1"if it is judged in the forward recognition based on the preview information that some pedestrian candidate exists.

In the step 5, the instructing unit 7 judges based on the infrastructure information from the information acquiring unit 6 whether any pedestrian exists on a road (accurately, on a pedestrian crossing covered by each of the information target sections (1) and (2)). If a positive judgment is made in the step 5, that is, if some pedestrian exists on a pedestrian crossing at the right-hand turn side or left-hand turn side, or some pedestrian exist on both the pedestrian crossings, the process shifts to step 6. On the other hand, if a negative judgment is made in the step 5, that is, if no pedestrian exists on both the pedestrian crossing at the right-hand turn side and the pedestrian crossing at the left-hand turn side, the process shifts to step 12.

In the step 6, it is judged whether the matching between the position of the pedestrian candidate base on the preview information and the position of the pedestrian based on the infrastructure information is established or not. This matching step does not require the strict coincidence between both the positions, and could be sufficient with establishment of a regional matching between the information target sections (1) and (2) shown in FIG. 2, for instance. In the case of turning to the right at the intersection, if some pedestrian candidate is detected on the right-side pedestrian crossing based on the preview information, it would be sufficient if the pedestrian exists in the information target section (2) based on the infrastructure information. Furthermore, in the case of turning to the left at the intersection, if some pedestrian candidate is detected on the left-side pedestrian crossing based on the preview information, it would be sufficient if the pedestrian exists in the information target section (1) based on the infrastructure information. The travel direction (turn to the right/turn to the left) of the vehicle concerned can be judged by detecting a right/left ON-state of a turn signal not shown in the figures.

If a positive judgment is made in the step 6, that is, if the matching between the pedestrian candidate based on the preview information and the pedestrian based on the infrastructure information is established, the process shifts to step 7. In this case, the coincidence between both the information increases the probability that the pedestrian candidate based on the preview information is a real pedestrian (not an electric pole or the like), and thus reliability as the preview information is considered high (high level).

In the step 7, the controlling unit 8 compares the distance D to the pedestrian with a control intervention distance Dth. The control intervention distance Dth is given according to the following equation 1.

$$D_{th}=V^2/(2\times 0.3\times g)+T_s\times V \qquad \text{[Equation 1]}$$

Figure 4:
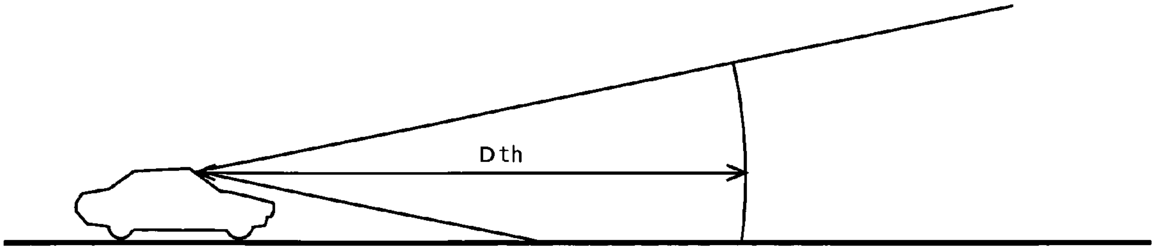
FIG. 4 is a diagram showing a control intervention distance Dth.
Figure 4:
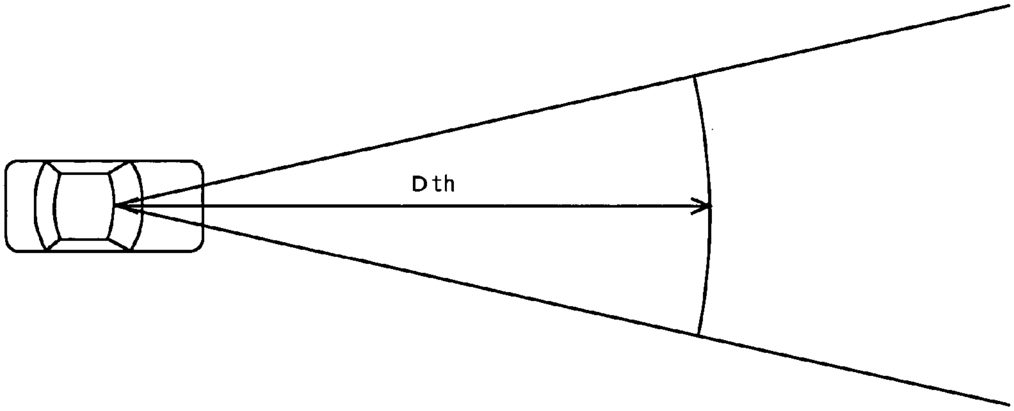

In the equation 1, "V" represents the vehicle speed, and "Ts" represents the delaytime of the system. FIG. 4 is a diagram showing the control intervention distance Dth. The control intervention distance Dth is a distance set so that the controlling unit 8 discriminates between a target object for which the control of the braking device 9 should be started and a target object for which this control is not required. If some pedestrian approaches within the control intervention distance Dth of the vehicle concerned, the controlling unit 8 judges that it is needed to start the automatic brake control. On the other hand, if the pedestrians exist outside the control intervention distance Dth, the controlling unit 8 judges that it is not needed to start the automatic brake control.

If the distance D to the pedestrian based on the preview information is not larger than the control intervention distance Dth (D≦Dth), the process shifts to step 8 according to the positive judgment made in the step 7. In the step 8, after the instructing unit 7 instructs authorization of the automatic braking to the controlling unit 8, the automatic braking operation of the vehicle is carried out by the braking device 9 (step 9), and then this routine is terminated.

On the other hand, if the distance D to the pedestrian is larger than the control intervention distance Dth (Dth<D), the process shifts to step 10 according to a negative judgment made in the step 7. In the step 10, the automatic braking is prohibited, and then the process shifts to step 11. Accordingly, in this case, the braking of the vehicle is exclusively charged to the driver's braking operation. In the step 11 subsequent to the step 10, the display device 10 or the speaker 11 is controlled (alarm process) in order to promote the driver to evoke his/her attention to the fact that some pedestrian exists in the travel direction of the vehicle concerned, and then this routine is terminated. In the alarm process, the display device 10 may be controlled to turn on and off a display screen, display a message "Pedestrian exists ahead" or display a picture representing the condition of the intersection, for example. Furthermore, the speaker 11 maybe controlled to output an alarm sound or output a voice announcement "Pedestrian exists ahead", for example.

On the other hand, if a negative judgment is made in the step 6, that is, if it is judged that the matching between the position of the pedestrian candidate based on the preview information and the position of the pedestrian based on the infrastructure information is not established, the process shifts to step 13. In this case, non-coincidence between both of the preview information and the infrastructure information increases the probability that the pedestrian candidate detected based on the preview information is a solid object different from a pedestrian, and thus the reliability as the preview information is considered low (low level). In the step 13, the automatic braking is prohibited, and then the process shifts to step 14. Therefore, even if some pedestrian based on the preview information approaches within a distance smaller than the control intervention distance Dth of the vehicle, the control of the braking device 9 is not carried out. In the step 14, the controlling unit 8 displays a picture representing the condition of pedestrians on the pedestrian crossing or outputs a voice announcement representing such a condition (information provision), and then this routine is terminated.

Furthermore, in the step 12 subsequent to the step 5, it is judged whether the pedestrian detecting flag Fs is set to "1" or not. If a positive judgment is made in the step 12, that is, if the pedestrian candidate is recognized based on the preview information whereas no pedestrian is recognized based on the infrastructure information, the process shifts to the step 13. In the step 13, the automatic braking is prohibited, and then the process shifts to the step 14. In the step 14, the controlling unit 8 carries out information provision, and then this routine is terminated.

On the other hand, if a negative judgment is made in the step 12, that is, if no pedestrian is recognized based on both of the preview information and the infrastructure information, the automatic braking is prohibited in the step 14, and then this routine is terminated.

As described above, according to the present embodiment, target objects existing in front of the vehicle concerned are detected as the preview information based on the preview sensor 2. In connection with this, the pedestrians on the pedestrian crossing are detected as the infrastructure information based on the road-side infrastructure 30. Furthermore, the automatic braking of the vehicle concerned is authorized if pedestrian candidates are specified among the target objects detected based on the preview information, and only if these pedestrian candidates are likewise detected based on the infrastructure information, in other words, under the condition that the matching between both the preview information and the infrastructure information is established. Accordingly, there can be avoided such a situation that an automatic braking operation not matched with the condition is carried out due to misidentification based on the preview information.

In the above embodiment, the target object is set to the pedestrian because pedestrian information detected by the road-side infrastructure 30 is used. However, from the viewpoint of using the infrastructure information and the preview information in combination, the target object of the present invention is not limited to the pedestrian, and may be a preceding vehicle or an oncoming vehicle. Specifically, the automatic braking of the vehicle is authorized only if a target object (preceding vehicle) detected based on the preview information is also detected based on the infrastructure information, that is, under the condition that the matching between both the preview information and the infrastructure information is established, for instance.

According to the present invention, the vehicle braking matched with the condition can be precisely performed by using both the information from the preview sensor installed in the vehicle and the information from the infrastructure.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

Additionally, the disclosure of Japanese Patent Application No. 2003-192074 filed on Jul. 4, 2003 including the specification, drawing and abstract is incorporated herein by reference in its entirety.

What is claimed is:

1. A vehicle braking device, comprising:

a recognizing unit for recognizing a target object based on information from a preview sensor that detects a forward condition of a vehicle and outputting position information of the target object thus recognized as preview information;

an information acquiring unit for specifying a target object located on a road based on information from an infrastructure equipped on the road and outputting position information of the target object thus specified as infrastructure information;

a controlling unit for automatically braking the vehicle; and an instructing unit for authorizing the controlling unit to automatically brake the vehicle under the condition that matching between a position of the target object based on the preview information and a position of the target object based on the infrastructure information is established.

2. The vehicle braking device as claimed in claim 1, wherein the information acquiring unit acquires pedestrian information concerning positions of pedestrians at an intersection, the pedestrian information being detected by the infrastructure.

3. The vehicle braking device as claimed in claim 2, wherein the instructing unit does not authorize the controlling unit to automatically brake the vehicle under the condition that the matching between the position of the target object based on the preview information and the position of the target object based on the infrastructure information is not established.

4. The vehicle braking device as claimed in claim 3, wherein the controlling unit carries out information provision based on the information from the infrastructure or gives an alarm to evoke attention to the target object in accordance with reliability of detection precision of the target object by the preview sensor.

5. The vehicle braking device as claimed in claim 2, wherein the controlling unit carries out information provision based on the information from the infrastructure or gives an alarm to evoke attention to the target object in accordance with reliability of detection precision of the target object by the preview sensor.

6. The vehicle braking device as claimed in claim 1, wherein the instructing unit does not authorize the controlling unit to automatically brake the vehicle under the condition that the matching between the position of the target object based on the preview information and the position of the target object based on the infrastructure information is not established.

7. The vehicle braking device as claimed in claim 6, wherein the controlling unit carries out information provision based on the information from the infrastructure or gives an alarm to evoke attention to the target object in accordance with reliability of detection precision of the target object by the preview sensor.

8. The vehicle braking device as claimed in claim 1, wherein the controlling unit carries out information provision based on the information from the infrastructure or gives an alarm to evoke attention to the target object in accordance with reliability of detection precision of the target object by the preview sensor.

9. A vehicle braking method, comprising:

a first step of recognizing a target object based on information from a preview sensor that detects a forward condition of a vehicle, and outputting position information of the target object thus recognized as preview information;

a second step of specifying a target object located on a road based on information from an infrastructure equipped on the road, and outputting position information of the target object thus specified as infrastructure information;

a third step of automatically braking the vehicle; and a fourth step of authorizing the automatic braking of the vehicle under the condition that matching between a position of the target object based on the preview information and a position of the target object based on the infrastructure information is established.

10. The vehicle braking method as claimed in claim 9, wherein the fourth step does not authorize the automatic braking of the vehicle under the condition that the matching between the position of the target object based on the preview information and the position of the target object based on the infrastructure information is not established.

11. The vehicle braking method as claimed in claim 10, further comprising a fifth step of carrying out information provision based on the information from the infrastructure or giving an alarm to evoke attention to the target object in accordance with reliability of detection precision of the target object by the preview sensor.

12. The vehicle braking method as claimed in claim 9, further comprising a fifth step of carrying out information provision based on the information from the infrastructure or giving an alarm to evoke attention to the target object in accordance with reliability of detection precision of the target object by the preview sensor.

* * * * *